United States Patent Office 3,525,774
Patented Aug. 25, 1970

3,525,774
ETHYLENE GLYCOL RECOVERY
Morris H. Clarke, Beaumont, Tex., assignor to Jefferson Chemical Company, Inc., Houston, Tex., a corporation of Delaware
No Drawing. Filed Aug. 2, 1967, Ser. No. 657,764
Int. Cl. C07c *29/24;* C08g *17/04*
U.S. Cl. 260—637                                    3 Claims

ABSTRACT OF THE DISCLOSURE

In the preparation of terephthalate polyesters it is necessary to employ an excess of ethylene glycol which is recovered at the completion of the reaction. This recovered ethylene glycol is contaminated with impurities which make it unsuitable for use without treatment. Purified ethylene glycol can be obtained from this contaminated ethylene glycol by first acidifying the material to precipitate soluble solid materials, adding ammonia to dissolve the precipitated solids and distilling ethylene glycol from the mixture.

BACKGROUND OF THE INVENTION

In the preparation of terrephthalate polyesters, about 50% of the ethylene glycol fed to the reaction is not consumed but is recovered at the completion of the reaction. This recovered ethylene glycol is contaminated with such impurities as methanol, dimethyl terephthalate, higher esters, acetals, alkaline salts of terephthalic acid and water. This contaminated ethylene glycol normally contains about 80% to about 98% ethylene glycol and is commonly referred to in the trade as "spent glycol."

Because of the impurities present, spent glycol is unfit for use without reprocessing or purification. Purification by a straight distillation is unsatisfactory due to excessive losses and poor quality of the recovered ethylene glycol. Also, during the distillation solid impurities in the spent glycol precipitate and plug the distillation equipment.

In the U.S. Pat. No. 2,788,373, a method for the purification of spent glycol is described wherein the spent glycol is first diluted with water, then acidified to precipitate solid materials which are removed by filtration and the ethylene glycol is then recovered by distillation. Although ethylene glycol of acceptable quality is obtained, the process is not entirely satisfactory because of the necessity of filtering the solids from the spent glycol and recoveries on the order of only 80% to 85% of the ethylene glycol contained in the spent glycol.

SUMMARY OF THE INVENTION

I have now discovered a process for the recovery of purified ethylene glycol from spent glycol which comprises diluting the spent glycol with water, acidifying the diluted solution to precipitate solids, adding ammonia to dissolve the precipitated solids, distilling to remove water and recovering the purified glycol by distillation. By the use of my process ethylene glycol recoveries of 95% or more are realized. Further, the process involves only simple distillation with no necessity for handling solid materials.

DESCRIPTION OF THE PREFERRED EMBODIMENT

In the practice of my process, the contaminated spent glycol is first diluted with water. Preferably, about 25% water based on the weight of spent glycol is used; however, the amount of water employed is not critical. Virtually any quantity of water can be used; however, from a practical standpoint, the use of larger amounts of water complicates the process, since the water must later be separated from the ethylene glycol.

After dilution of the spent glycol, the mixture is made acidic by the addition of a mineral acid selected from the class consisting of sulfuric acid, hydrochloric acid and phosphoric acid. The preferred acid for my process is phosphoric acid. Sufficient acid is added to substantially completely precipitate dissolved solids. The amount of acid necessary to bring about complete precipitation will vary with the nature and amount of impurities present in the spent glycol. The proper amount of acid for use with any given spent glycol can be readily determined by slowly adding acid to a small portion of the spent glycol until precipitation is complete. I have found that, in general, lowering the pH to a value of four or less is sufficient.

The precipitated solids in the spent glycol are then dissolved by the addition of ammonia to the mixture. The precipitated solids are generally terephthalic acid or terephthalate esters which are converted to soluble amides by reaction with the ammonia. The amount of ammonia necessary will vary with the amount of solids precipitated. Sufficient ammonia should be added to completely dissolve all the solids. The amount required for treatment of a particular spent glycol can be readily determined by working with a small portion of the spent glycol. The ammonia is most conveniently used in the form of ammonium hydroxide. In general, I have found that the addition of ammonia to a pH of about seven is sufficient.

After the solids have been dissolved by the addition of ammonia, water is removed from the mixture by distillation. Purified ethylene glycol is then recovered from the de-watered spent glycol by distillation, preferably at a reduced pressure because of the high boiling point of ethylene glycol. The amides formed upon the addition of the ammonia are high boiling liquids and are removed from the distillation as bottoms. These distillations can be accomplished in any convenient manner employing standard engineering practices.

My process will be further illustrated by the following example.

EXAMPLE I

To 200 gm. of spent glycol was added 3 gm. of 85% phosphoric acid. The solution was agitated for 24 hours at atmospheric pressure and 25° C. and a precipitate formed. To the mixture was added 29% ammonium hydroxide, 1 gm. at a time, until the odor of ammonium was just barely detectable. The solution was agitated for one hour between each addition. A total of 3 gm. of ammonium hydroxide was added. The flask was then stoppered and agitated for 24 hours. All the precipitate dissolved. The resulting solution was de-watered by distillation at atmospheric pressure using a packed laboratory column at a 1:1 reflux ratio. Ethylene glycol was distilled from the dry solution in a packed laboratory column at a pressure of 3–4 mm. of mercury. The overhead temperature was 85° to 87° C. and the pot temperature was 110° to 114° C. There were no solids buildup and no plugging of the column. The bottoms remained fluid throughout the distillation. The recovery of purified ethylene glycol was 96%. The purified ethylene glycol had a color of five on the platinum-cobalt scale, a water content of 0.06 wt. percent and was almost odorless.

What is claimed is:

1. A process for recovering purified ethylene glycol from spent glycol which consists essentially of diluting the spent glycol with water, acidifying the diluted spent glycol with a mineral acid selected from the class consisting of sulfuric acid, phosphoric acid and hydrochloric acid in an amount sufficient to substantially completely precipitate soluble solid matter, adding sufficient ammonia to completely dissolve the precipitate, removing the water from the solution by distillation and distilling the ethylene glycol.

2. A process as in claim 1 wherein 25% water based on the weight of spent glycol is added.

3. A process as in claim 1 wherein the acid is phosphoric acid.

References Cited

UNITED STATES PATENTS

| 2,788,373 | 4/1957 | Mills et al. | 260—637 |
| 3,311,544 | 3/1967 | Riehl et al. | 260—637 |

LEON ZITVER, Primary Examiner

J. E. EVANS, Assistant Examiner

U.S. Cl. X.R.

260—558